(12) United States Patent
Jansson (10) Patent No.: US 7,852,969 B2
(45) Date of Patent: Dec. 14, 2010

(54) SYSTEM AND METHOD FOR DYNAMIC CALIBRATION OF A QUADRATURE ENCODER

(75) Inventor: Bjorn E. B. Jansson, Snohomish, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 700 days.

(21) Appl. No.: 11/830,684

(22) Filed: Jul. 30, 2007

(65) Prior Publication Data

US 2009/0034641 A1    Feb. 5, 2009

(51) Int. Cl.
*H04L 27/36* (2006.01)
(52) U.S. Cl. .................. 375/298; 375/296; 375/299; 375/346
(58) Field of Classification Search .................. 375/261, 375/259, 298, 319, 324; 370/206, 207
See application file for complete search history.

(56) References Cited

U.S. PATENT DOCUMENTS

| | | | | |
|---|---|---|---|---|
| 5,371,481 | A | * | 12/1994 | Tiittanen et al. ............ 332/103 |
| 5,448,555 | A | * | 9/1995 | Bremer et al. .............. 370/206 |
| 6,563,443 | B2 | | 5/2003 | Oberhauser |
| 6,686,585 | B2 | | 2/2004 | Grimes |
| 6,897,435 | B2 | | 5/2005 | Remillard |
| 7,075,057 | B2 | | 7/2006 | Remillard |
| 7,126,109 | B2 | | 10/2006 | Goldman |
| 7,193,205 | B2 | | 3/2007 | Remillard |
| 2005/0194524 | A1 | | 9/2005 | Remillard |
| 2008/0043871 | A1 | * | 2/2008 | Latouche et al. ............ 375/261 |

* cited by examiner

*Primary Examiner*—Chieh M Fan
*Assistant Examiner*—Qutbuddin Ghulamali
(74) *Attorney, Agent, or Firm*—Christensen O'Connor Johnson Kindness PLLC (57) ABSTRACT

A system and method for real time calibration of a quadrature encoder. Errors from sources such as signal offsets, amplitude mismatches and phase errors are addressed. In one embodiment, the errors are addressed by determining and applying a dynamic operational set of calibration parameters. The process for determining the operational calibration parameters involves minimizing a variation metric that indicates the variations of the magnitudes of a set of corrected vectors Ci". The corrected vectors Ci" are defined by using the calibration parameters to provide corrected vector components (Ati", Bti") that correspond to a current operational set of quadrature signal samples comprising at least four respective quadrature signal samples (Ati, Bti) having spatial phase angles θti that are distributed over a significant portion of 360 degrees. For well chosen calibration parameters, the resulting corrected vectors define a well-centered circle and the variation metric is minimized.

13 Claims, 5 Drawing Sheets

SYSTEM AND METHOD FOR DYNAMIC CALIBRATION OF A QUADRATURE ENCODER

BACKGROUND

The invention relates generally to precision measurement instruments, and more particularly to a system and method for dynamic calibration of quadrature signals such as those used in a position encoder.

Various position encoders for sensing linear, rotary or angular movement are currently available. These encoders are generally based on inductive, capacitive, optical, or magnetic transducers. In general, an encoder may comprise a transducer with a readhead and a scale. The readhead may comprise a transducer element and some transducer electronics. The transducer output signals vary as a function of the position of the readhead relative to the scale along a measuring axis. The transducer electronics output the signals to a signal processor or process the signals internally before outputting modified signals indicative of the position of the readhead relative to the scale. It is also common for an encoder system to include an interface electronics separate from the readhead, and to interpolate or otherwise processes the transducer signals in the interface electronics before outputting modified signals indicative of the position of the readhead relative to the scale to an external host system such as a motion control system or data acquisition system.

Certain encoder systems utilize quadrature signals. As an example, in a two-phase system a transducer may output two signals A and B that vary sinusoidally as a function of the position of the readhead relative to the scale along the measuring axis. In one common concept for transducers, the signals A and B are intended to be identical except for a quarter-wavelength phase difference between them. In other words, the signals are in quadrature (i.e., a quarter-wavelength out of phase relative to each other.) In other systems (e.g., 3-phase), the signals may be combined so as to produce similar signals in quadrature. The transducer electronics then use these quadrature signals to derive the instantaneous position of the readhead relative to the scale along the measuring axis.

For encoders that utilize quadrature signals, three common error sources that may occur are signal offsets, amplitude mismatches and phase errors. U.S. Pat. No. 6,897,435, hereby incorporated herein by reference in its entirety, discloses a self-calibration method that is intended to address these types of error sources for quadrature encoders. As described in the '435 patent, the encoder includes a circuit for generating gain, offset, and phase calibration coefficients, where the circuit compares the phase space position of a measured phasor with the position of an idealized phasor. The locus of the idealized phasor in phase space is intended to be a circle of predetermined radius with no offset. The encoder applies the calibration coefficients to the measured quadrature signals, and creates an output signal representative of the current, calibrated phase. For generating the calibration coefficients, a coefficient generator module applies a series of logical tests to decide if the measured phasor lies on a unit circle. If the measured phasor is not on the unit circle, then the module increments or decrements the various calibration coefficients until the phasor does lie on that circle.

The '435 patent describes an example where the measured phasor has only a positive offset. In a first position, where the measured phasor is at approximately 0°, the gain and offset are incremented in the negative direction, while at a second position when the measured phasor is at approximately 180°, the offset is again incremented in the negative direction but the gain is incremented in the positive direction. It is noted that in this example, the gain is alternately reduced and increased, with a net effect of no change, while the offset is continually made more negative, which thus corrects for the initial positive offset. This example illustrates one of the drawbacks of the method of the '435 patent, in that while the net result to one of the calibration coefficients (i.e., the gain) is no change, the process of incrementing and decrementing the calibration coefficients in this manner, and the general concept of making such changes based only on the data of the current measured phasor position, may in some implementations be considered inefficient.

The present invention is directed to a quadrature encoder that overcomes the foregoing and other disadvantages. More specifically, the present invention is directed to a system and method for dynamic calibration, wherein the calibration coefficients are determined by storing a history of sample values for which a specified criteria (e.g., the variance of a metric related to the sample values) is utilized for the determination of the optimum calibration coefficients.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method according to this invention provides dynamically corrected quadrature signal samples during ongoing measurement operations of a displacement sensor that provides uncorrected periodic quadrature signals A and B. In general, ongoing measurement operations means those operations performed during the normal operating mode of a displacement sensor, e.g., during a time when it is being used to provide measurement signals the are intended to measure or control displacements in a host system, or the like. Thus, the systems and methods disclosed here are particularly well suited for providing ongoing measurement values that are adaptively and precisely corrected in real time, in an end use installation.

In accordance with one aspect of the invention, common error sources that afflict quadrature signals are adaptably removed. More specifically, signal offsets, amplitude mismatches and phase errors are specifically addressed, while other error sources (e.g., harmonic distortion) may also be compensated for. In various embodiments, a dynamically changing "current" operational set of calibration parameters $a_o$, $b_o$, $x$ and $k$ maybe applied to uncorrected quadrature samples ($A_i$, $B_i$) to provide corrected quadrature signal samples ($A_i''$, $B_i''$) where $A_i''=[(A_i-a_o)+x(B_i-b_o)]$ and $B_i''=k(B_i-b_o)$.

In accordance with various aspects of the invention, a current operational set of calibration parameters $a_o$, $b_o$, $x$ and $k$ maybe determined by sampling the uncorrected quadrature signals to provide a current operational set of quadrature signal samples ($A_{ti}$, $B_{ti}$), wherein the current operational set of quadrature signal samples ($A_{ti}$, $B_{ti}$) comprises at least N respective quadrature signal samples ($A_{ti}$, $B_{ti}$) having spatial phase angles $\theta_{ti}$ that satisfy a phase angle distribution criterion wherein at least N respective spatial phase angles $\theta_{ti}$ are distributed such that the minimum phase angle range that can be defined that includes each of the at least N respective spatial phase angles $\theta_{ti}$ spans at least 225 degrees of spatial phase shift, and N is an integer that is at least 4. The members of the current operational set of quadrature signal samples (Ati, Bti) may be updated continuously. A temporary variation metric may be determined based on a temporary set of calibration parameters ao', bo', x' and k', wherein the temporary variation metric corresponds to the variability of the magnitudes of a set of temporary corrected vectors Ci' corresponding to the members (Ati, Bti) of the current operational set of quadrature signal samples, where each temporary corrected vector Ci' has corrected vector components (Ati', Bti') where Ati'=[(Ati−ao')+x'(Bti−bo')] and Bti'=k'(Bti−bo'). Then it may be determined whether the temporary variation metric indicates a smaller variability than a current variation metric based on a current operational set of calibration parameters ao, bo, x and k that is used to determine corrected quadrature signal samples (Ai", Bi") during ongoing measurement operations, wherein the current variation metric corresponds to the variability of the magnitudes of a set of current corrected vectors Ci" corresponding to the members (Ati, Bti) of the current operational set of quadrature signal samples, where each current corrected vector Ci" has corrected vector components (Ati", Bti") where Ati"=[(Ati−ao)+x(Bti−bo)] and Bti"=k(Bti−bo). If the temporary variation metric indicates a smaller variability than the current variation metric, then the temporary set of calibration parameters ao', bo', x' and k' is used as a new current operational set of calibration parameters ao, bo, x and k that is used to determine corrected quadrature signal samples (Ai", Bi") during ongoing measurement operations. If the temporary variation metric does not indicate a smaller variability than the current variation metric, then the current operational set of calibration parameters ao, bo, x and k is left unchanged, and the temporary set of calibration parameters ao', bo', x' and k' is adjusted and the temporary variation metric and the current variation metric are again compared, and so on.

In various embodiments, it may be advantageous to determine the temporary variation metric corresponding to the variability of the magnitudes of the set of temporary corrected vectors Ci' by determining the temporary variation metric based on the squares of the magnitudes of the set of temporary corrected vectors Ci', without determining the magnitudes of the set of temporary corrected vectors Ci'. The current variation metric corresponding to the variability of the magnitudes of the set of temporary corrected vectors Ci" may be similarly determined.

Certain advantages may be provided in various embodiments where N is at least 5, or 6, or 8, and/or the minimum phase angle range that can be defined that includes each of the at least N respective spatial phase angles θti spans at least 270 degrees of spatial phase shift. In some embodiments, it may be advantageous to structure the current operational set of quadrature signal samples (Ati, Bti) to include at least one respective member (Ati, Bti) in each of at least N respective spatial phase angle ranges that are mutually exclusive and that together cover approximately 360 degrees. In some embodiments, it may be advantageous to stored and/or replace the members of a current operational set of quadrature signal samples (Ati, Bti) in a memory element in a manner that corresponds to such a structure.

The present invention has advantages over certain prior art calibration methods in that it is a dynamic method, which may optimally correct for local errors in local ranges of displacement along an encoder scale, for example. It is more efficient that certain prior art methods in that it directly finds the calibration parameters that provide the best accuracy without first characterizing errors in the uncorrected quadrature signals. It is well suited for a high performance hardware implementation of dynamic calibration in certain types of circuitry such as FPGAs and ASICs. It is more robust and stable against noise than certain prior art methods in that it is based on the use of plurality of recent signal samples having spatial phase angles distributed over a significant portion of 360 degrees, which improves other aspects of the resulting calibration, as well (e.g., less sensitivity to occasional contamination-induced errors, the ability to correct harmonic errors, etc.). Furthermore, the invention comprises only a few simple, repeatable steps which is advantageous over other more complex implementations in hardware which would require more resources, and also results in a higher speed of execution.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
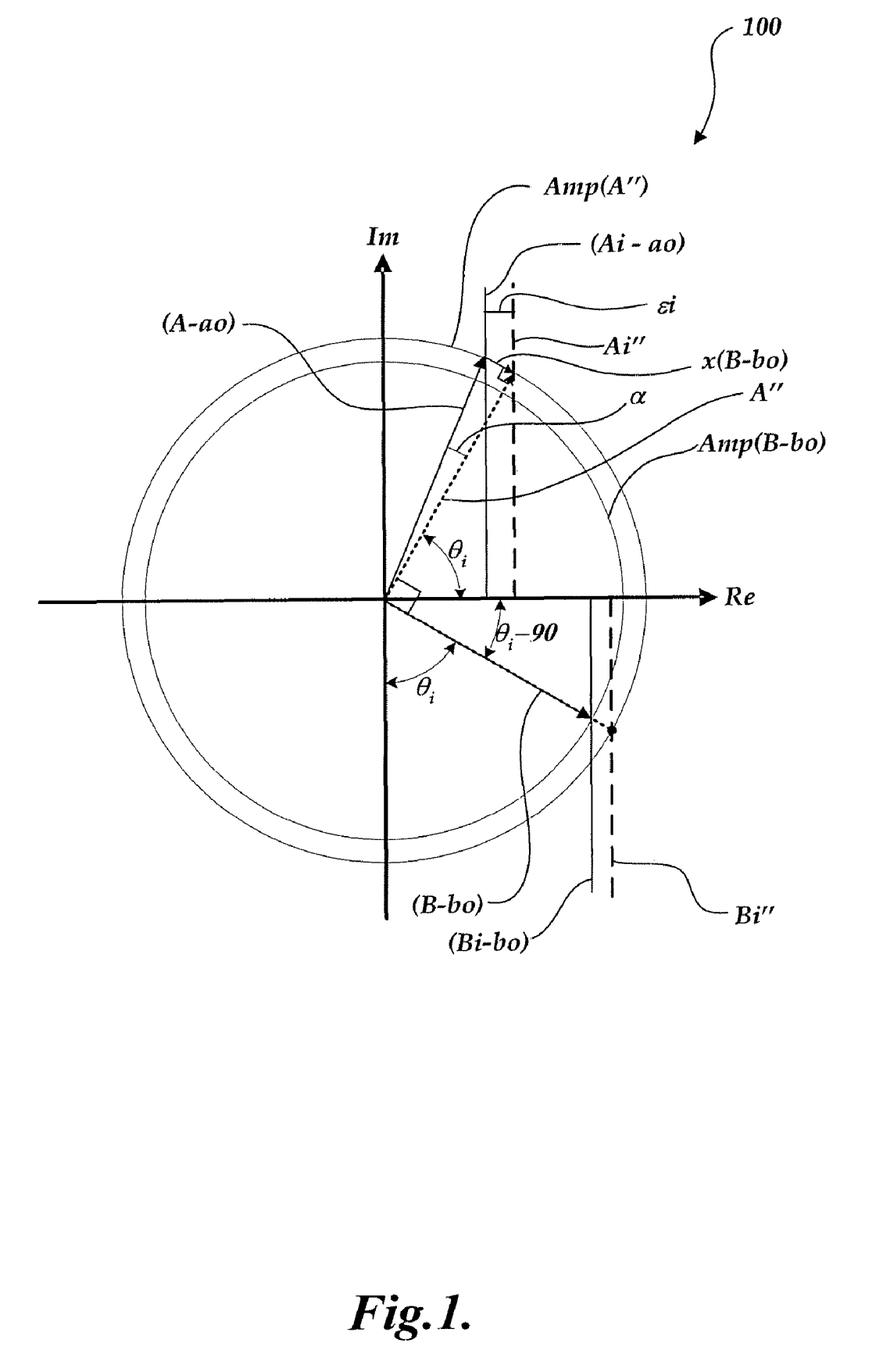
FIG. 1 is a diagram illustrating phase and amplitude corrections for quadrature signals.

FIG. 1 is a phasor diagram 100 illustrating phase and amplitude corrections for quadrature signals. As shown in FIG. 1, two phasor signals (A−ao) and (B−bo) are illustrated in the complex plane. As will be described in more detail below, the phasor components Ai" and Bi" are corrected quadrature signal components derived from raw signal phasors A and B at a phase angle θi.

As shown in FIG. 1, the signals (Ai−ao) and (Bi−bo) corresponding to a spatial phase angle θi are the real components of the phasors (A−ao) and (B−bo), respectively, at that phase angle θi. That is (Ai−ao)=Re(A−ao) at (θi) and (Bi−bo)=Re(B−bo) at (θi). The phasors (A−ao) and (B−bo) shown in FIG. 1 are raw phasor signals A and B corrected for offset errors ao and bo. An offset error can be described as a constant value that has been added to each quadrature signal by some error process. Offset errors thus correspond to offsetting the phasors A and B along the real axis. If offset errors can be determined, they can be subtracted from the signal values. This is one step in error-correcting the quadrature signals.

The equations for offset correction may be represented as:

$$Re(A-ao)=Re\ A_{raw}-ao \qquad \text{(Eq. 1)}$$

$$Re(B-bo)=Re\ B_{raw}-bo \qquad \text{(Eq. 2)}$$

where $A_{raw}$ and $B_{raw}$ are signal phasors associated with raw signals output by a displacement sensor or encoder, including offset errors, and ao and bo are the offset errors included in the phasor signals $A_{raw}$ and $B_{raw}$, respectively. Similarly, for specific phase angles θi:

$$Re(A-ao)\ \text{at}\ (\theta i)=Re\ A_{raw}(\theta i)-ao=Ai-ao \qquad \text{(Eq. 3)}$$

$$Re(B-bo)\ \text{at}\ (\theta i)=Re\ B_{raw}(\theta i)-bo=Bi-bo \qquad \text{(Eq. 4)}$$

where the quadrature signals Ai=Re $A_{raw}(\theta i)$ and Bi=Re $B_{raw}(\theta i)$ are the measured quadrature output signal data provided by an encoder at a position i. The signals (Ai–ao) and (Bi–bo) correspond to offset-corrected phasor components along the real axis in FIG. 1.

Ideally, for accurate position determination, quadrature signals should correspond to two sinusoidal (with respect to position) signals that have equal amplitudes where one signal (the cosine signal) leads the other (the sine signal) by exactly 90°. When amplitude mismatch error is present, the amplitudes will be slightly different. When phase error is present, one signal will lead the other by a phase angle slightly different than 90°, as represented by the phase error angle α in FIG. 1. As will be described in more detail below, phasors (A–ao) and (B–bo) include these types of errors as shown in FIG. 1, while the corrected quadrature signals Ai" and Bi" have had these errors removed.

In FIG. 1, the phase angle θi may be measured counterclockwise from the positive real (Re) axis. The phasor signal (B–bo) is taken to provide the reference phase so that the phase error may be considered as afflicting the phasor signal (A–ao), exclusively.

As one step to provide ideally-corrected quadrature signals, the phase error component εi may be removed from the signal (Ai–ao). It will be appreciated that the geometric relationship between phasor signals (A–ao) and (B–bo) is nominally constant. Thus, as may be seen by inspection of FIG. 1, it is possible to add a selected portion x(B–bo) of the phasor (B–bo) to the phasor (A–ao), to construct a corrected phasor A" with a 90 phase shift compared to the phasor (B–bo), where x is the same for all angles θi. This corrected phasor A" has an amplitude of Amp(A"). We can find the corrected quadrature component Ai" shown in FIG. 1, which is the real axis component magnitude of the corrected phasor A", as:

$$Ai'' = (Ai - ao) + \varepsilon i \quad \text{(Eq. 5)}$$

$$= (Ai + ao) + (x*(Bi - bo))$$

$$= (ReA_{raw}(\theta i) - ao) + (x*(ReB_{raw}(\theta i) - bo))$$

The amplitude of the phasor (B–bo) may be multiplied by a factor k=[(Amp(A"))/(Amp(B–bo))] to match the amplitude of the corrected phasor A". Since multiplying a phasor magnitude by a factor k is the same as multiplying the magnitudes of its components by the factor k, we can find the corrected quadrature component Bi" shown in FIG. 1, according to the equation:

$$Bi''=k*(Bi-bo)=k*(Re\ B_{raw}(\theta i)-bo) \quad \text{(Eq. 6)}$$

Based on the previous discussion, it is shown that the ideal quadrature signal components Ai" and Bi" may be expressed in terms of the measured raw quadrature signal components Ai and Bi, using EQUATIONS 5 and 6. The calibration parameters ao, bo, k, and x may be determined as described further below. Then, as is known in the art, the position of an encoder may be accurately estimated by the following EQUATION 7, where λ is the spatial wavelength of the encoder quadrature signals, and $\tan^{-1}$ is a four-quadrant inverse tangent function that analyzes the relative signs of Bi" and Ai" in order to determine the inverse tangent angle unambiguously.

$$\text{position } i = \frac{\lambda}{2\pi} \cdot \tan^{-1} \frac{Bi''}{Ai''} \quad \text{(Eq. 7)}$$

It should be appreciated that it is not necessary to explicitly determine the amplitude and phase errors described above during the operation of a quadrature encoder system according to this invention. However, they may be determined in various embodiments if it is desired to display the errors that are being compensated for.

Figure 2:
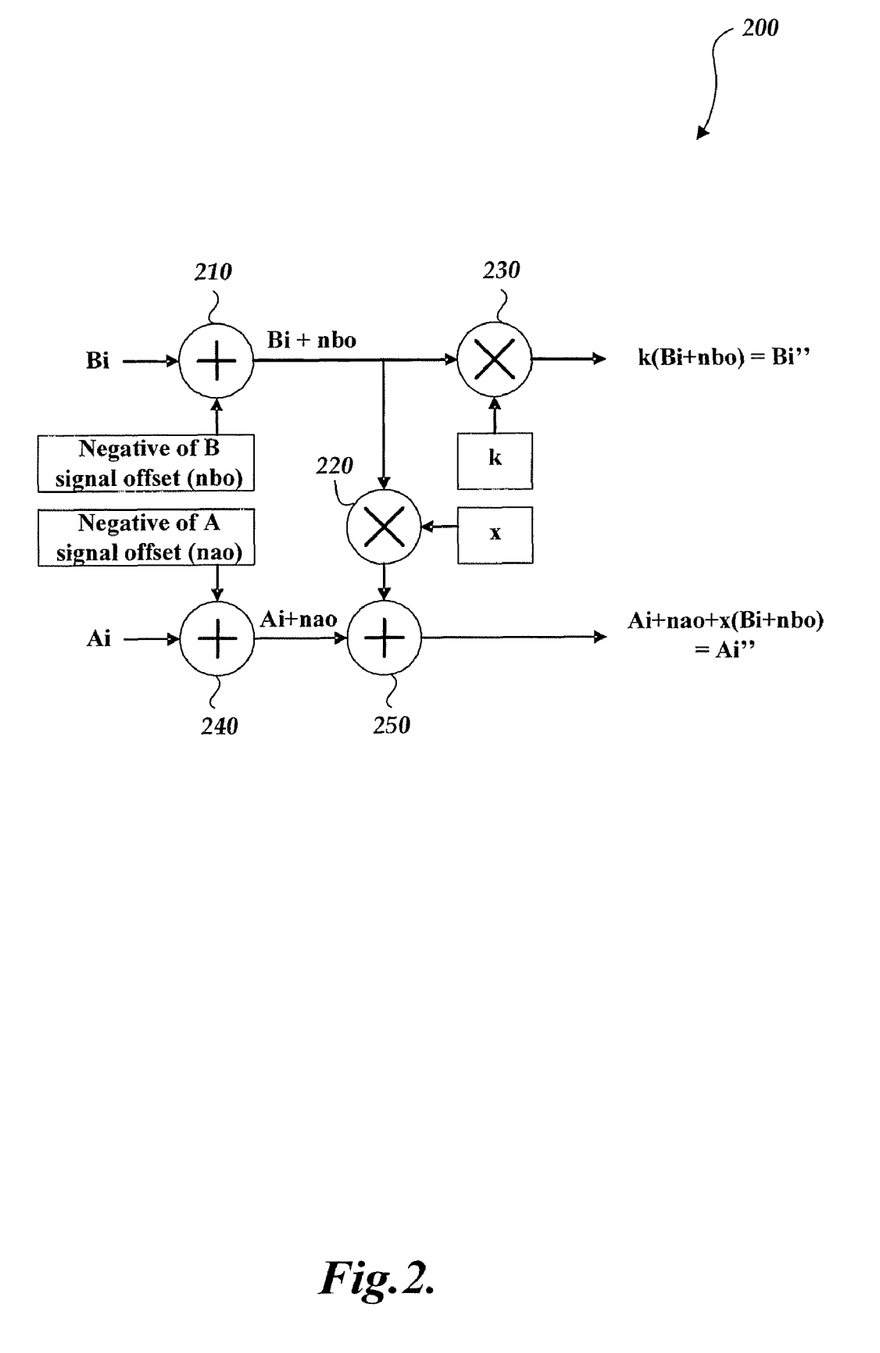
FIG. 2 is a block diagram illustrating an implementation of an error correction method in which calibration parameters are applied to quadrature signals.

FIG. 2 is a block diagram illustrating a symbolic hardware implementation 200 in which operational calibration parameters are applied to measured quadrature signals Ai and Bi, to provide corrected quadrature signals Ai" and Bi". The determination of the operational calibration parameters is described further below, with reference to FIGS. 3 and 4. As shown in FIG. 2, a quadrature signal Bi and a calibration parameter nbo (which is the negative of the signal B offset) are summed by an adder 210 to produce a signal Bi+nbo. The signal Bi+nbo and a calibration parameter x are then multiplied by a multiplier 220 to produce a signal x(Bi+nbo). In addition, the signal Bi+nbo and a scaling parameter k are multiplied by a multiplier 230 to produce an output signal k(Bi+nbo)=Bi".

As shown at the bottom of FIG. 2, a quadrature signal Ai and a calibration parameter nao (which is the negative of the signal A offset) are summed by an adder 240 to produce a signal Ai+nao. The signal Ai+nao and the signal x(Bi+nbo) are summed by an adder 250 to produce an output signal [Ai+nao+x(Bi+nbo)]=Ai". It will be appreciated that the utilization of the adders 210, 240 and 250 is advantageous in that in certain implementations they are simpler to implement in hardware circuitry than similar subtractor components.

In one embodiment of the invention, once the corrected quadrature signals Ai" and Bi" are determined utilizing the operational calibration parameters as outlined above, the precise position of the encoder may be determined by utilizing phase position interpolation within a given period or spatial wavelength of the encoder quadrature signals according to EQUATION 7. The interpolation process is made more accurate if the quadrature signals A and B are corrected for errors, which is the reason for undertaking the error correction and calibration processes as described above.

Figure 3:
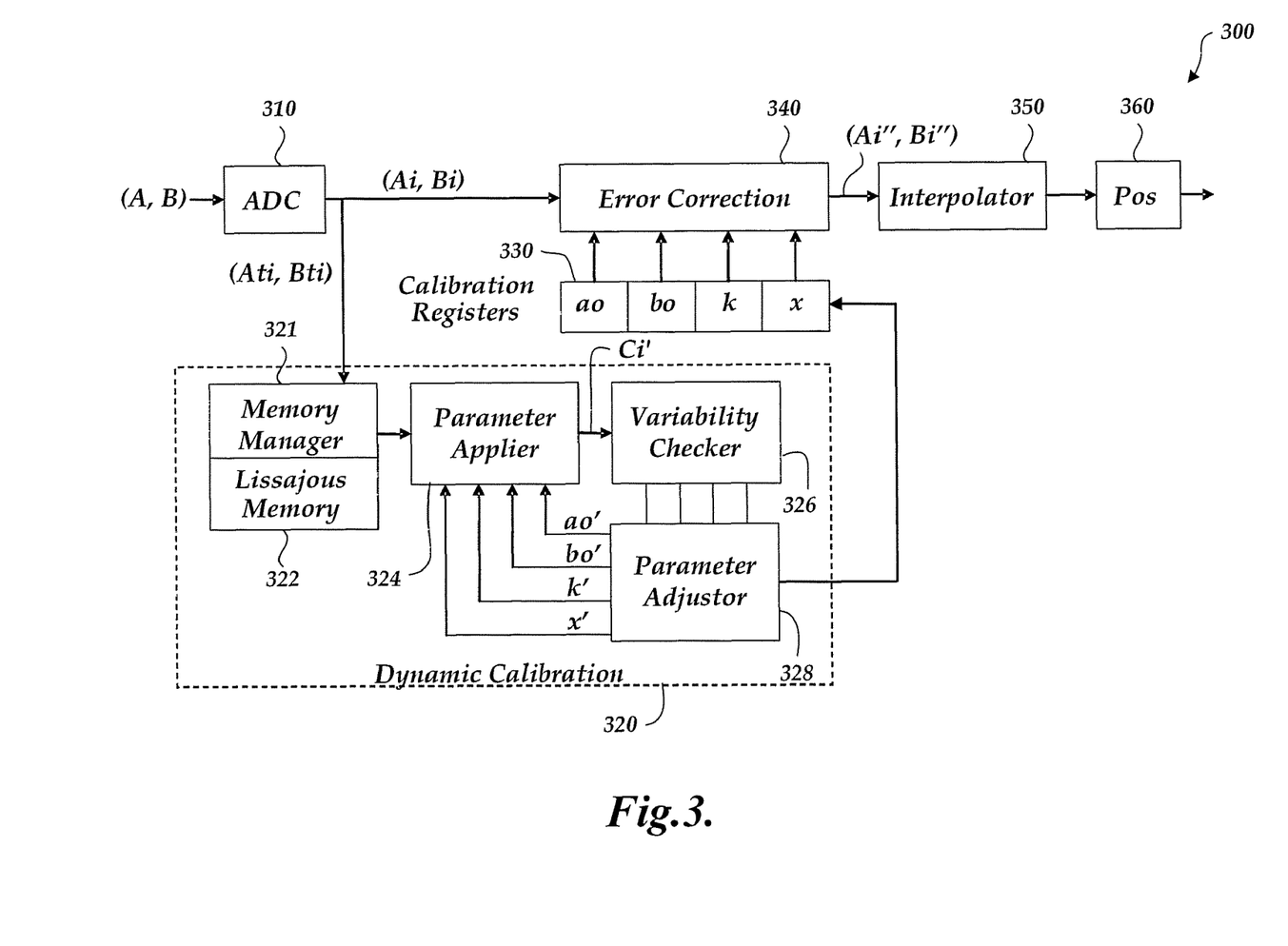
FIG. 3 is a block diagram of a system for dynamic calibration of a quadrature encoder.

FIG. 3 is a block diagram of a system 300, usable as a portion of a signal processing and control system that provides dynamically corrected quadrature signal samples during ongoing measurement operations of a displacement sensor that provides uncorrected periodic quadrature signals A and B. The system 300 includes an analog-to-digital converter 310, a dynamic calibration block 320, calibration registers 330, an error correction block 340, an interpolator block 350 and a position register 360. The dynamic calibration block 320 includes a memory manager 321, a Lissajous memory 322, a parameter applier 324, a variability checker 326 and a parameter adjuster 328. It will be understood that in the signal processing and control system, synchronization and control of the components shown in FIG. 3 may be provided using a controller (e.g., including a system clock and a suitably programmed FPGA, or the like), not shown, according to known methods.

During operation, in the embodiment shown in FIG. 3, the system 300 receives a pair of periodic analog quadrature signals [A, B] from position encoder and samples then at a spatial phase position θi. The signals A and B are converted from analog to digital by the analog-to-digital converter 310, and then applied to the operational error correction block 340 as signals Ai and Bi, and to the dynamic calibration block 320 as signals Ati and Bti.

The error correction block 340 removes errors from the signals Ai and Bi by applying the values of a current operational set of calibration parameters ao, bo, x and k from the calibration registers 330 (e.g., as described above with reference to FIG. 2). The output from the error correction block 340 is signals Ai" and Bi" which are input to the interpolator block 350. The interpolator block 350 determines the position within a current spatial wavelength based on the signals Ai" and Bi" (e.g., using EQUATION 7), and then outputs that position information to the position register 360. The position register 360 analyzes the input position information to determine an accumulated position change and/or a current position, and outputs the resulting position.

In the dynamic calibration block 320, the Lissajous memory 322 is managed by the memory manager 321 to capture a current operational set of quadrature signal samples (Ati, Bti) comprising at least 4 samples having spatial phases θi that are well distributed over a significant portion of 360°, as described in greater detail below. During ongoing operations, the oldest data samples may generally be overwritten with new data samples when they become available. The parameter applier block 324 applies a temporary set of calibration parameters ao', bo', x' and k' to the current operational set of quadrature signal samples (Ati, Bti) and outputs corresponding temporary corrected vectors Ci' to the variability checker 326. The temporary corrected vectors Ci' have temporary corrected vector components (Ati', Bti') determined by applying the temporary set of calibration parameters ao', bo', x' and k' in a manner analogous that described above with reference to EQUATIONS 5 and 6 and/or FIG. 2). The variability checker 326 may also determine or receive current corrected vectors Ci" that have current corrected vector components (Ati", Bti") determined by applying the current set of calibration parameters ao, bo, x and k to the current operational set of quadrature signal samples (Ati, Bti) in the manner described above with reference to EQUATIONS 5 and 6 and/or FIG. 2).

As previously outlined, ideally, each corrected quadrature signal sample pair should provide sine and cosine signals corresponding to the same phase angle and the same peak signal amplitude. Thus, if they are used as vector components to provide a corrected vector (e.g., a vector Ci', or Ci"), the tips of each such corrected vector should fall on a circle. Thus, in various embodiments the variability checker 326 may be used to determine whether a set of "temporary" corrected vectors Ci', provided by applying the temporary calibration parameters ao', bo', k' and x' to the current operational set of quadrature signal samples (Ati, Bti), provides a better fit to a circle than a set of "current" corrected vectors Ci", provided by applying the current operational set of calibration parameters ao, bo, x and k to a current operational set of quadrature signal samples (Ati, Bti). When the temporary calibration parameters ao', bo', k' and x' improve the fit relative to the current operational set of calibration parameters ao, bo, x and k, the parameter adjustor 328 updates the calibration registers 330 so that the temporary calibration parameters ao', bo', k' and x' are thereafter used as the current operational set of calibration parameters ao, bo, x and k in the main signal processing channel. Various considerations related to the memory manager 321, the Lissajous memory 322, the variability checker 326 and the parameter adjustor 328 are described further below.

Figure 4A:
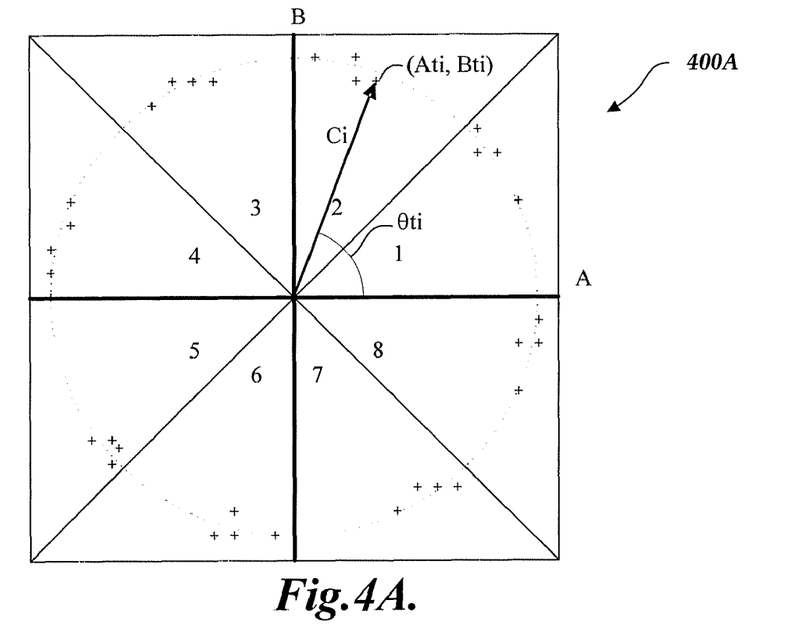
FIGS. 4A and 4B are diagrams of Lissajous memories in which sets of samples corresponding to quadrature signals are recorded.
Figure 4B:
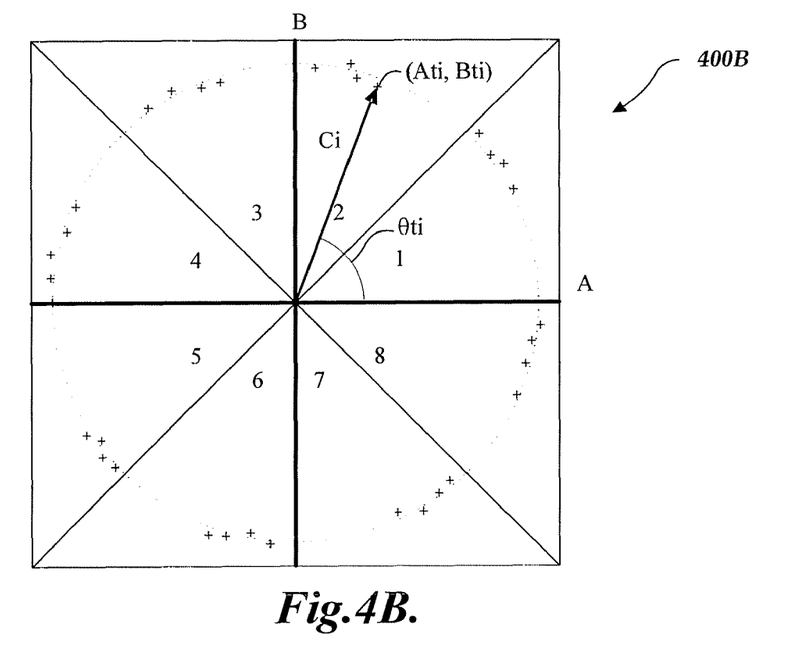

FIGS. 4A and 4B are diagrams of data points corresponding to a current operational set of quadrature signal samples (Ati, Bti) schematically distributed in two Lissajous memories 400A, in which the data points are recorded. As used herein, the term Lissajous memory applies to any memory arrangement wherein A and B quadrature signal samples that correspond to the same encoder position are related to one another in the memory structure or the stored information. As will be described in more detail below, for purposes of dynamic calibration it is advantageous to not only store and use an operational set of quadrature signal samples including a plurality of the last several samples of the signals A and B collected, but also to collect or store the operational set of quadrature signal samples such that they correspond to a group of spatial phase angle ranges distributed approximately evenly over a 360° range In one embodiment, each of the Lissajous memories 400A and 400B are utilized for storing the signal samples from different wavelengths of the encoder, which are combined to form a current operational set of quadrature signal samples. The utilization of the two Lissajous memories 400A and 400B allow better averaging and signal correction to be achieved, in that if there are minor errors in the data samples from one wavelength, the data samples from the another wavelength may mitigate the effects of those errors. To provide a convenient method of description, FIGS. 4A and 4B each show a generic representative vector Ci that has components (Ati, Bti) corresponding to a stored data sample (Ati, Bti) and a phase angle θti, that is included in the current operation set of quadrature signal samples. In this implementation, according to this method of description, as the encoder moves in one direction and the corresponding representative vector Ci proceeds to various phase angles around one of the Lissajous memories (e.g., the memory 400A), as it passes a particular phase angle where the encoder passes from one wavelength to the next (e.g., passing to angle less than 0 degrees or more than 360 degrees), the system will begin recording the signal samples in the next Lissajous memory (e.g., memory 400B) corresponding to the next adjacent wavelength (e.g., −360 to 0 degrees, or 360 to 720 degrees). Correspondingly, if the encoder moves back into the original 360 degree range, the reverse process will occur (e.g., moving the signal sample storage location back from the memory 400B to the memory 400A.) The utilization of the two "different wavelength" memories 400A and 400B, which include quadrature signal samples that are combined to form a current operational set of quadrature signal samples, has advantages such as producing better averaging, among other advantages.

In the embodiment illustrated in FIGS. 4A and 4B, the AB coordinate system of each of the memories 400A and 400B is subdivided into eight segments (i.e. octants) each holding a certain number of data points corresponding to stored data samples (Ati, Bti), represented by '+' symbols. As the system collects and error-corrects data samples (Ati, Bti), new (uncorrected) data samples may also continue to be stored to replace previous samples in one of the memories 400A or 400B. The memories 400A and 400B can each be seen as eight separate memories or memory segments, each holding, in this example, four data samples. In one specific example embodiment, as a new data sample arrives into an octant, the oldest value in that octant is overwritten, keeping only the four newest samples in that octant. As the spatial phase of the position of the encoder (corresponding by the vector Ci) proceeds around each memory 400A or 400B, the memory segments are constantly updated, one by one.

A determination may be made as to which memory segments (e.g., an octant) each sample pair belongs in by considering the signs of the signals A and B (indicating the quadrant) and the relative size of the absolute values of the samples (determining which one of two possible octants applies). For example, if both the signals A and B are positive, the sample is in quadrant 1 (octants 1 and 2). Then if |B|>|A|, the sample is in octant 2, otherwise in octant 1. In one embodiment, the categorization of which octant a sample pair belongs to is only important for storing the sample, thereby overwriting the old sample. For the remainder of the calibration process it does not matter which octant the sample point came from as long as the samples are reasonably well distributed around the Lissajous memory. The division into octants ensures that the samples are well distributed. In one specific example embodiment, the system is implemented in an FPGA using four sample points per octant for a total of 32 sample points in each memory 400A and 400B, where A and B are 10-bit numbers. In this specific example embodiment, the system has experimentally been determined to perform well within desired sample rates (e.g., 40 MHz).

It will be appreciated the forgoing embodiment is exemplary only, and not limiting. For example, 6 degree ranges of approximately 60 degrees may be used rather than octants, a single Lissajous memory may be used rather than two, a distribution criterion to be met by the members of a current operational set of quadrature signal samples may be satisfied by selecting and/or replacing the members based on analysis rather based on their relationship to a particular memory structure, and so on.

More generally, in various embodiments, a current operational set of quadrature signal samples (Ati, Bti) may be provided that comprises at least N respective quadrature signal samples (Ati, Bti) that satisfy a phase angle distribution criterion wherein at least N respective spatial phase angles θi are distributed such that the minimum phase angle range that can be defined that includes each of the at least four respective spatial phase angles θi spans at least 225 degrees of spatial phase shift, and N is an integer that is at least 4. Such a current operational set of quadrature signal samples may support determination of dynamic calibration parameters that provide sufficient accuracy for some applications. However, in other embodiments, when N is at least 5, and the minimum phase angle range that can be defined that includes each of the at least four respective spatial phase angles θi spans at least 270 degrees of spatial phase shift, such a current operational set of quadrature signal samples may support determination of dynamic calibration parameters that provide better accuracy.

According to previously outlined principles, when a set of calibration parameters is well chosen, the resulting corrected vectors Ci' or Ci'', determined according to methods outlined previously and corresponding to all the data in the current operational set of quadrature signal samples, will closely fit a well-centered circle. On the other hand, if the offsets ao and bo are not well chosen then the corrected vectors will correspond to an off-center circle, and if the amplitude and phase parameters k and x are not well chosen then the corrected vectors will tend to fit an ellipse. In either case, the worse the choice of calibration parameters, the more variation there will be in the magnitude of the corrected vectors Ci' or Ci''. Thus, in one embodiment, the optimum calibration parameters may be determined in accordance with those which minimize the variance of the magnitudes of the resulting corrected vectors. It will be appreciated that this overall approach is advantageous over certain other prior art algorithms which seek to first characterize the errors in the measured data, and then compute the calibration parameters from the characterized errors. In contrast, the present method is directly determines calibration parameters that result in the "best" corrected data, without the need to explicitly determine the errors in the original sample data.

As an example, in order to calculate the variance (e.g., in the variability checker 326) of the magnitudes of a set of temporary corrected vectors Ci', their magnitudes must first be determined. The magnitude of the vectors Ci' can be computed by the following equation:

$$|Ci'| = \sqrt{Ati'^2 + Bti'^2} \quad \text{(Eq. 8)}$$

However, in one embodiment it is desirable to not perform a square root computation, to save both execution time and hardware resources. It will be appreciated that if the variance for $|Ci'|^2$ is minimized, this also minimizes the variance of $|Ci'|$. Therefore, in one embodiment the following equation may be utilized, which avoids the square root computation.

$$|Ci'|^2 = Ati'^2 + Bti'^2 \quad \text{(Eq. 9)}$$

The following equation is of a form commonly used to compute a variance $\sigma^2$. N is the number of data samples stored in the Lissajous memory and the summation corresponds to all the N data samples.

$$\sigma^2 = \frac{\sum |Ci'^2|^2 - \frac{(\sum |Ci'^2|)^2}{N}}{N} \quad \text{(Eq. 10)}$$

Since N is a constant, in one embodiment it can be eliminated from the bottom division. This is so because if N $\sigma^2$ is minimized, with N constant, then $\sigma^2$ is also minimized. Furthermore, if N is chosen as a power of two ($N=2^m$), then the remaining division can be replaced by a right-shift of n bits, thus simplifying the operation in the hardware since non-power-of-2 divisions are in certain implementations more complex to perform.

It will be appreciated that there are numerous possible implementations for setting up the computation of the variance, at various levels of parallelism, for balancing hardware resources versus computation time. In the following embodiment, the quantities $|C_i'^2|^2$ and $|Ci_i'^2|$ are computed and accumulated one element at a time in a set of accumulators D and E, respectively. Once all the N quantities have been processed, the two accumulators are combined according to the following operation:

$$\text{variation metric} = D - (E^2 >> n) \quad \text{(Eq. 11)}$$

where $>>n$ symbolizes a right shift by n bits. In this example, it will take approximately 64 clock cycles to compute the results in the accumulators D and E, and an additional cycle to compute the variation metric for a total of approximately 65 clock cycles. Of course, either or both of a temporary variation metric corresponding to a set of temporary corrected vectors Ci' and a current variation metric corresponding to a set of current corrected vectors Ci'' may be determined using the principles outlined above.

For providing calibration parameters that minimizing a variation metric, various known solving algorithms may be applied to minimize the errors of a given set of equations in a number of unknown variables. To save hardware resources and development time, as will be described in more detail below, in one embodiment a much simplified algorithm is utilized to optimize the calibration parameters. One reason a simplified algorithm may be used is that in one implementation the search does not end after a certain number of iterations. There is no "final result" in this type of algorithm, but a constantly changing, adaptive result, the next result improving on the previous and/or adapting to the most recent data samples. Another reason is that in one embodiment fixed point arithmetic is used, where the resolution is much more finite than in floating point arithmetic which could in certain implementations require more complex computations.

In accordance with the simplified algorithm, the algorithm proceeds through respective steps where the temporary set of calibration parameters are determined and adjusted such that each temporary set of calibration parameters ao', bo', x' and k' has three parameters that have the same values as the corresponding parameters of the current operational set of calibration parameters ao, bo, x and k, and one parameter of the temporary set of calibration parameters has a value that differs by a selected amount relative to the value of the corresponding parameter of the current operational set of calibration parameters. In one embodiment, a respective one of the parameters ao', bo', x' and k' is incremented or decremented by predetermined amount of one unit (one count), the corresponding temporary corrected vectors Ci' are determined as outlined previously, and the corresponding temporary variation metric is determined. If the temporary variation metric is better than a current variation metric determined in a comparable way based on the when the calibration parameters is be changed, that value of that calibration parameter is kept, otherwise the previous value is kept. Simultaneously, the system keeps track of which of the larger or smaller calibration parameter values corresponded to the better variation metric so that the next increment or decrement of the value is more likely to be in the right direction. Next, the system changes the next respective calibration parameter by one unit and re-computes the variation metric, again keeping either the new or old calibration parameter value that resulted in the better variation metric. This means that each time the system has computed the variation metric, it varies one calibration parameter by one count. After four such cycles the system has varied all four calibration parameters (ao, bo, x and k) by one count, effectively choosing between two values for each calibration parameter. This process may continue in perpetuity, each time improving each calibration parameter by one count, or verifying that the most recent previous values were already the best. When a new set of calibration parameters produce a better variation metric, the main signal processing calibration parameter registers are updated with the new set of calibration parameters.

In some embodiments, the parameters may be scaled relative to one another according to predetermined scaling factors, and/or relative to the output level of the ADC (e.g., the ADC 310, shown in FIG. 3) such that the parameters can be communicated as integer numbers and still retain the desired precision. For example, the offset factors may be scaled such that the LSB of the offset parameter values ao and bo is approximately or identically of the same significance as the LSB of the ADC output. The phase and amplitude factors x and k may be scaled (based on simulation, for example) such that the observed change in the variance or variation metric outlined above that results from changing the parameters x or k by one LSB is similar to the change in the variance or variation metric that results from changing the parameters ao or bo by one LSB. Since in one embodiment each calibration parameter is held in a register of only a few bits (e.g., 6 bits), only a limited number of cycles will be required before the optimum combination of calibration parameters is found. In one specific example embodiment, the values for the calibration parameter registers were in one experimental trial found to be oa=−4, ob=−2, x=1, and k=2. In many cases, the correct combination of calibration parameters may generally be found in four or five complete cycles, limited by the worst offender (oa=−4, in this example), and considering that the system may have initially started searching in the wrong direction. If a complete cycle takes 65×4=260 clock cycles, the correct combination in this case could be found in approximately 5×260=1,300 cycles. Using a 40 MHz clock frequency, the correct set of calibration parameters could then be found in 32.5 μs after the encoder system fills the Lissajous memory. To fill the Lissajous memory, in one embodiment it is generally desirable to move the encoder by at least one wavelength after power-up (or, in another embodiment, two wavelengths to fill two different-wavelength Lissajous memories.) After the algorithm has converged on the optimum set of calibration parameters, the calibration parameters may then be verified and potentially modified each 260 clock cycles, or every 6.5 μs. This ensures that the calibration parameters keep up with the fairly rapid changes of the transducer conditions, and the changing data samples. In one specific example embodiment, for a movement time of 6.5 μs, with the encoder moving at a speed of 0.5 m/s, it will travel 3.25 μm in this time. The calibration parameter update rate is adequate for this example, although further improvements in the speed can be made by further increasing the parallelism of the variance computation. In certain embodiments, the computation may also be slowed down if this speed is deemed excessive, which in certain embodiments may save hardware resources and power consumption.

It may be appreciated based on the foregoing description that the determination and comparison of the respective variation metrics corresponding to temporary and current sets of calibration parameters may take a significant number of clock cycles, whereas new quadrature samples may be acquired and used for the current operational set of quadrature signal samples (Ati, Bti) much more frequently. Thus, in various embodiments, at least one of the temporary variation metric and the current variation metric may be based partially on a first number of members (Ati, Bti) from the contents of first current operational set of quadrature signal samples (Ati, Bti) and based partially on a second number of members (Ati, Bti) from later (continuously changing) versions of the current operational set of quadrature signal samples (Ati, Bti). For example, the analysis that provides the corrected vectors Ci' or Ci" may proceed by processing sequential spatial phase angles in the current operational set of quadrature signal samples, and if a member of the current operational set of quadrature signal samples is replaced before the entire set is processed, that may be inconsequential because the errors in the individual samples may be small, the set may have on the order of 20-40 members or more, and the overall calibration process continuously adjusts to eliminate minor temporary disturbances.

Figure 5:
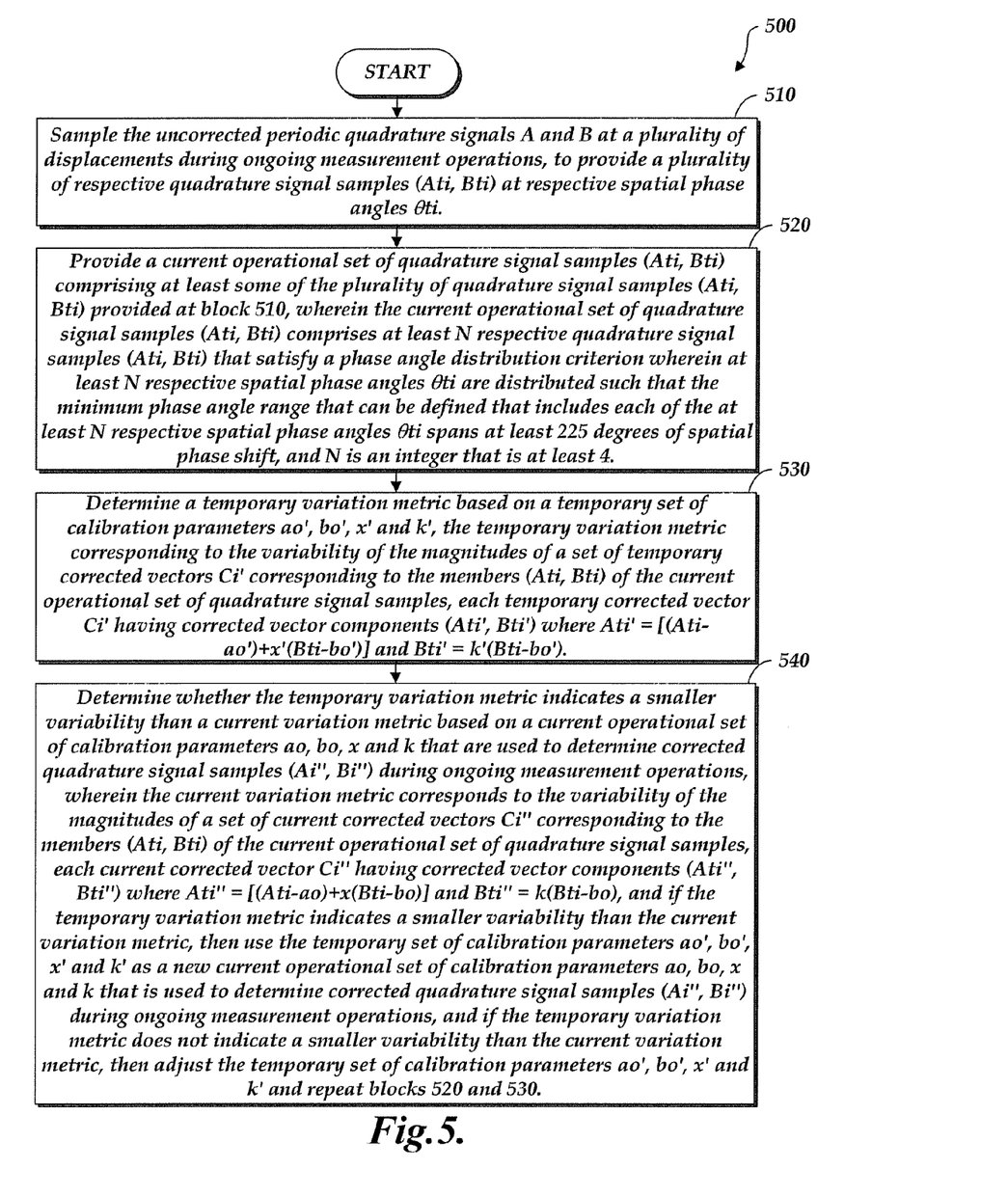
FIG. 5 is a flow diagram of a routine for providing dynamically corrected quadrature signal samples during ongoing measurement operations of a displacement sensor that provides uncorrected periodic quadrature signals A and B.

FIG. 5 is a flow diagram of an exemplary embodiment of a routine 500 for providing dynamically corrected quadrature signal samples during ongoing measurement operations of a displacement sensor that provides uncorrected periodic quadrature signals A and B. At a block 510, the uncorrected periodic quadrature signals A and B are sampled at a plurality of displacements during ongoing measurement operations to provide a plurality of respective quadrature signal samples (Ati, Bti) at respective spatial phase angles θti. At a block 520 a current operational set of quadrature signal samples (Ati, Bti) is provided, comprising at least some of the plurality of quadrature signal samples (Ati, Bti) provided by block 510, wherein the current operational set of quadrature signal samples (Ati, Bti) comprises at least N respective quadrature signal samples (Ati, Bti) that satisfy a phase angle distribution criterion wherein at least N respective spatial phase angles θti are distributed such that the minimum phase angle range that can be defined that includes each of the at least four respective spatial phase angles θti spans at least 225 degrees of spatial phase shift, and N is an integer that is at least 4. At a block 530, a temporary variation metric is determined based on a temporary set of calibration parameters ao', bo', x' and k', the temporary variation metric corresponding to the variability of the magnitudes of a set of temporary corrected vectors Ci' corresponding to the members (Ati, Bti) of the current operational set of quadrature signal samples, each temporary corrected vector Ci' having corrected vector components (Ati', Bti') where Ati'=[(Ati−ao')+x'(Bti−bo')] and Bti'=k'(Bti−bo').

At a block 540, it is determined whether the temporary variation metric indicates a smaller variability than a current variation metric based on a current operational set of calibration parameters ao, bo, x and k that is used to determine corrected quadrature signal samples (Ai", Bi") during ongoing measurement operations, wherein the current variation metric corresponds to the variability of the magnitudes of a set of current corrected vectors Ci" corresponding to the members (Ati, Bti) of the current operational set of quadrature signal samples, each current corrected vector Cti" having corrected vector components (Ati", Bti") where Ati"=[(Ati−ao)+x(Bti−bo)] and Bti"=k(Bti−bo). If the temporary variation metric indicates a smaller variability than the current variation metric, then the temporary set of calibration parameters ao', bo', x' and k' is used as a new current operational set of calibration parameters ao, bo, x and k that is used to determine corrected quadrature signal samples (Ai", Bi") during ongoing measurement operations, and if the temporary variation metric does not indicate a smaller variability than the current variation metric, then the temporary set of calibration parameters ao', bo', x' and k' is adjusted and blocks 520 and 530 are repeated (without altering the current operational set of calibration parameters ao, bo, x and k). The temporary set of calibration parameters ao', bo', x' and k' may be determined and/or adjusted as outlined previously herein.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for providing dynamically corrected quadrature signal samples during ongoing measurement operations of a displacement sensor that provides uncorrected periodic quadrature signals A and B, the method comprising:
   (a) sampling the uncorrected periodic quadrature signals A and B at a plurality of displacements during the ongoing measurement operations to provide a plurality of respective quadrature signal samples (Ati, Bti) at respective spatial phase angles θti;
   (b) providing a current operational set of quadrature signal samples (Ati, Bti) comprising at least some of the plurality of respective quadrature signal samples (Ati, Bti) provided by step (a), wherein the current operational set of quadrature signal samples (Ati, Bti) comprises at least N respective quadrature signal samples (Ati, Bti) that satisfy a phase angle distribution criterion wherein at least N respective spatial phase angles θti are distributed such that the minimum phase angle range that can be defined that includes each of the at least N respective spatial phase angles θti spans at least 225 degrees of spatial phase shift, and N is an integer that is at least 4;
   (c) determining a temporary variation metric based on a temporary set of calibration parameters ao', bo', x', and k', the temporary variation metric corresponding to the variability of the magnitudes of a set of temporary corrected vectors Ci' corresponding to the respective quadrature signal samples (Ati, Bti) of the current operational set of quadrature signal samples, each temporary corrected vector of the set of temporary corrected vectors Ci' having corrected vector components (Ati', Bti') where Ati'=[(Ati−ao')+x'(Bti−bo')] and Bti'=k'(Bti−bo'); and
   (d) determining whether the temporary variation metric indicates a smaller variability than a current variation metric based on a current operational set of calibration parameters ao, bo, x, and k that is used to determine corrected quadrature signal samples (Ai", Bi") during ongoing measurement operations, wherein the current variation metric corresponds to the variability of the magnitudes of a set of current corrected vectors Ci" corresponding to the respective quadrature signal samples (Ati, Bti) of the current operational set of quadrature signal samples, each current corrected vector of the set of current corrected vectors Ci" having corrected vector components (Ati", Bti") where Ati"= [(Ati−ao)+x(Bti−bo)] and Bti"=k(Bti−bo), and if the temporary variation metric indicates a smaller variability than the current variation metric, then using the temporary set of calibration parameters ao', bo', x', and k' as a new current operational set of calibration parameters ao, bo, x, and k that is used to determine the corrected quadrature signal samples (Ai", Bi") during ongoing measurement operations, and if the temporary variation metric does not indicate a smaller variability than the current variation metric, then leaving the current operational set of calibration parameters ao, bo, x, and k unchanged, and adjusting the temporary set of calibration parameters ao', bo', x', and k' and repeating steps (c) and (d).

2. The method of claim 1, wherein steps (a), (b), (c) and (d) are performed during the ongoing measurement operations.

3. The method of claim 2, wherein in step (b) providing the current operational set of quadrature signal samples (Ati, Bti) comprises storing the at least N respective quadrature signal samples (Ati, Bti) that satisfy the phase angle distribution criterion to a memory element that is connected to the displacement sensor during the ongoing measurement operations.

4. The method of claim 3, comprising;
   after storing the at least N respective quadrature signal samples (Ati, Bti) that satisfy the phase angle distribution criterion to the memory element to provide a current operational set of quadrature signal samples (Ati, Bti) in step (b), providing a new current operational set of quadrature signal samples (Ati, Bti) comprising at least N respective quadrature signal samples (Ati, Bti) that satisfy the phase angle distribution criterion and using the new current operational set of quadrature signal samples (Ati, Bti) as the current operational set of quadrature signal samples (Ati, Bti), wherein providing the new current operational set of quadrature signal samples (Ati, Bti) comprises:
   sampling the uncorrected periodic quadrature signals A and B at least one additional displacement during the ongoing measurement operations to provide at least one respective replacement quadrature signal sample (Ari, Bri) having a replacement spatial phase angle θri such that if a corresponding respective member (Ati, Bti) of the current operational set of quadrature signal samples (Ati, Bti) is replaced with the respective replacement quadrature signal sample (Ari, Bri), a new current operational set of quadrature signal samples (Ati, Bti) is provided that satisfies the phase angle distribution criterion; and
   storing the at least one respective replacement quadrature signal sample (Ari, Bri) to the memory element and using it to replace a corresponding respective member (Ati, Bti) of the current operational set of quadrature signal samples to provide the new current operational set of quadrature signal samples (Ati, Bti).

5. The method of claim 4, wherein N is an integer that is at least 5.

6. The method of claim 5, wherein the current operational set of quadrature signal samples (Ati, Bti) comprises at least N respective quadrature signal samples (Ati, Bti) that satisfy a phase angle distribution criterion wherein at least N respective spatial phase angles θti are distributed such that the minimum phase angle range that can be defined that includes each of the at least four respective spatial phase angles θti spans at least 270 degrees of spatial phase shift.

7. The method of claim 6, wherein:
N is an integer that is at least 6;
the method is performed such that each current operational set of quadrature signal samples (Ati, Bti) is arranged to include at least one respective member (Ati, Bti) in each of at least six respective spatial phase angle ranges that are mutually exclusive and that together cover approximately 360 degrees; and
when storing the at least one respective replacement quadrature signal sample (Ari, Bri) to the memory element and using it to replace a corresponding respective member (Ati, Bti) of the current operational set of quadrature signal samples to provide a new current operational set of quadrature signal samples (Ati, Bti), the corresponding respective member (Ati, Bti) of the current operational set of quadrature signal samples that is replaced by a respective replacement quadrature signal sample (Ari, Bri) having a replacement spatial phase angle θri, is a corresponding respective member (Ati, Bti) in the spatial phase angle range that includes the replacement spatial phase angle θri.

8. The method of claim 7, wherein each current operational set of quadrature signal samples (Ati, Bti) is arranged to include at least two respective members (Ati, Bti) in each spatial phase angle range, and the corresponding respective member (Ati, Bti) of the current operational set of quadrature signal samples that is replaced by a respective replacement quadrature signal sample (Ari, Bri) having a replacement spatial phase angle θri is the oldest respective member (Ati, Bti) in the spatial phase angle range that includes the replacement spatial phase angle θri.

9. The method of claim 4, wherein the operations of steps (c) and (d) are performed over a first nominal time period, and the method comprises:
performing the operations of providing a new current operational set of quadrature signal samples (Ati, Bti) and using it as the current operational set of quadrature signal samples (Ati, Bti) a plurality of times during the first nominal time period; and
determining at least one of the temporary variation metric and the current variation metric based partially on a first number of members (Ati, Bti) from a first current operational set of quadrature signal samples (Ati, Bti) and based partially on a second number of members (Ati, Bti) from at least a second current operational set of quadrature signal samples (Ati, Bti).

10. The method of claim 2, wherein determining the temporary variation metric corresponding to the variability of the magnitudes of the set of temporary corrected vectors $Ci'$ comprises determining the variation metric based on the squares of the magnitudes of the set of temporary corrected vectors $Ci'$.

11. The method of claim 10, wherein the squares of the magnitudes of the set of temporary corrected vectors $Ci'$ are determined without determining the magnitudes of the set of temporary corrected vectors $Ci'$.

12. The method of claim 2, wherein the temporary set of calibration parameters ao', bo', x', and k' are determined and adjusted such that each time step (c) is performed, three of the members of the temporary set of calibration parameters ao', bo', x', and k' have the same values the corresponding members of the current operational set of calibration parameters ao, bo, x, and k, and one member of the temporary set of calibration parameters ao', bo', x', and k' has a value that differs by a selected amount relative to the value of the corresponding member of the current operational set of calibration parameters ao, bo, x, and k.

13. The method of claim 12, wherein for each respective calibration parameter ao', bo', x', and k', the corresponding respective selected amount is always a respective predetermined and fixed amount.

* * * * *